US006885283B2

(12) United States Patent
O'Connor et al.

(10) Patent No.: US 6,885,283 B2
(45) Date of Patent: Apr. 26, 2005

(54) COMBINED TIRE PRESSURE MONITORING AND KEYLESS ENTRY RECEIVER

(75) Inventors: Steve O'Connor, West Bloomfield, MI (US); Tejas B. Desai, Sterling Heights, MI (US); Allan Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 323 days.

(21) Appl. No.: 10/146,371

(22) Filed: May 15, 2002

(65) Prior Publication Data

US 2002/0177406 A1 Nov. 28, 2002

Related U.S. Application Data

(63) Continuation-in-part of application No. 10/079,665, filed on Feb. 20, 2002.
(60) Provisional application No. 60/352,489, filed on Jan. 23, 2002, provisional application No. 60/349,882, filed on Jan. 17, 2002, provisional application No. 60/298,258, filed on Jun. 14, 2001, provisional application No. 60/290,923, filed on May 15, 2001, provisional application No. 60/276,325, filed on Mar. 16, 2001, provisional application No. 60/276,210, filed on Mar. 15, 2001, and provisional application No. 60/269,959, filed on Feb. 20, 2001.

(51) Int. Cl.[7] ............................. G05B 19/00; G06F 7/00
(52) U.S. Cl. ...................... 340/5.61; 340/5.6; 340/5.64; 340/10.1; 340/10.2; 340/10.5; 340/5.62
(58) Field of Search ............................ 340/10.3, 447, 340/442, 449, 445, 539.1, 10.4, 426.36, 505, 444, 10.1; 73/146.3; 455/39; 370/339, 311

(56) References Cited

U.S. PATENT DOCUMENTS

| | | | |
|---|---|---|---|
| 3,497,625 A | | 2/1970 | Oxley |
| 5,463,374 A | | 10/1995 | Mendez et al. |
| 5,473,938 A | | 12/1995 | Handfield et al. |
| 5,602,868 A | | 2/1997 | Wilson |
| 5,661,651 A | | 8/1997 | Geschke et al. |
| 5,790,946 A | * | 8/1998 | Rotzoll .................... 455/343.1 |
| 5,963,128 A | | 10/1999 | McClelland |
| 6,043,738 A | | 3/2000 | Stewart et al. |
| 6,218,936 B1 | | 4/2001 | Imao |
| 6,232,875 B1 | | 5/2001 | DeZorzi |
| 6,252,498 B1 | | 6/2001 | Pashayan, Jr. |
| 6,259,361 B1 | | 7/2001 | Robillard et al. |
| 6,271,748 B1 | | 8/2001 | Derbyshire et al. |
| 6,650,236 B2 | * | 11/2003 | Ghabra et al. .............. 340/447 |

FOREIGN PATENT DOCUMENTS

| | | |
|---|---|---|
| EP | 0671289 A1 | 12/1994 |
| EP | 0735219 A2 | 3/1996 |

* cited by examiner

Primary Examiner—Michael Horabik
Assistant Examiner—Vernal Brown

(57) ABSTRACT

A receiver assembly (16) includes an amplitude shift keyed mode (52) and a frequency shift keyed mode (58) selectively engagable to receive radio frequency transmissions from the tire monitoring system (26) and a remote keyless entry system (20) and switches between modes in response to receipt of a wake up pattern.

22 Claims, 6 Drawing Sheets

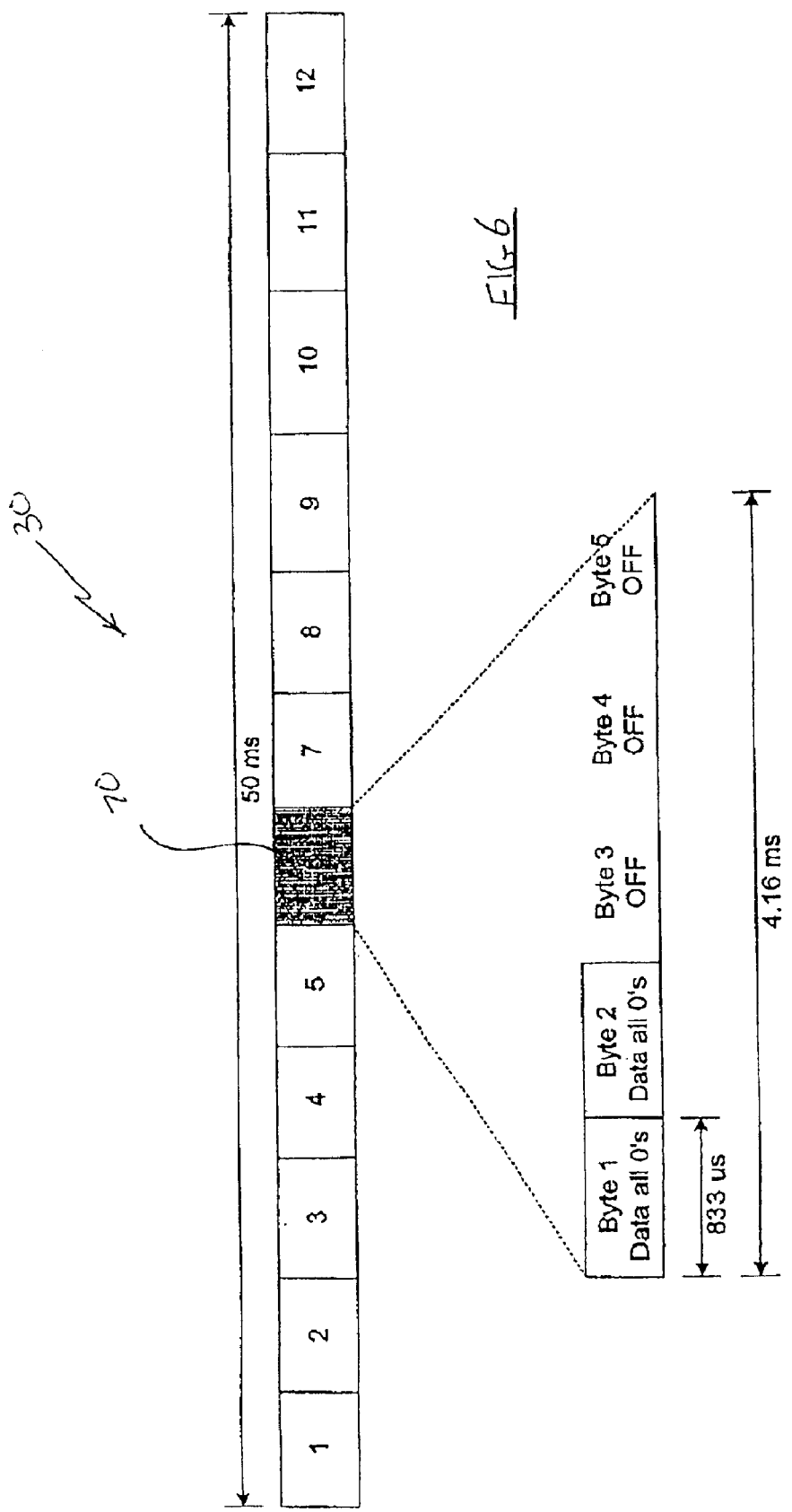

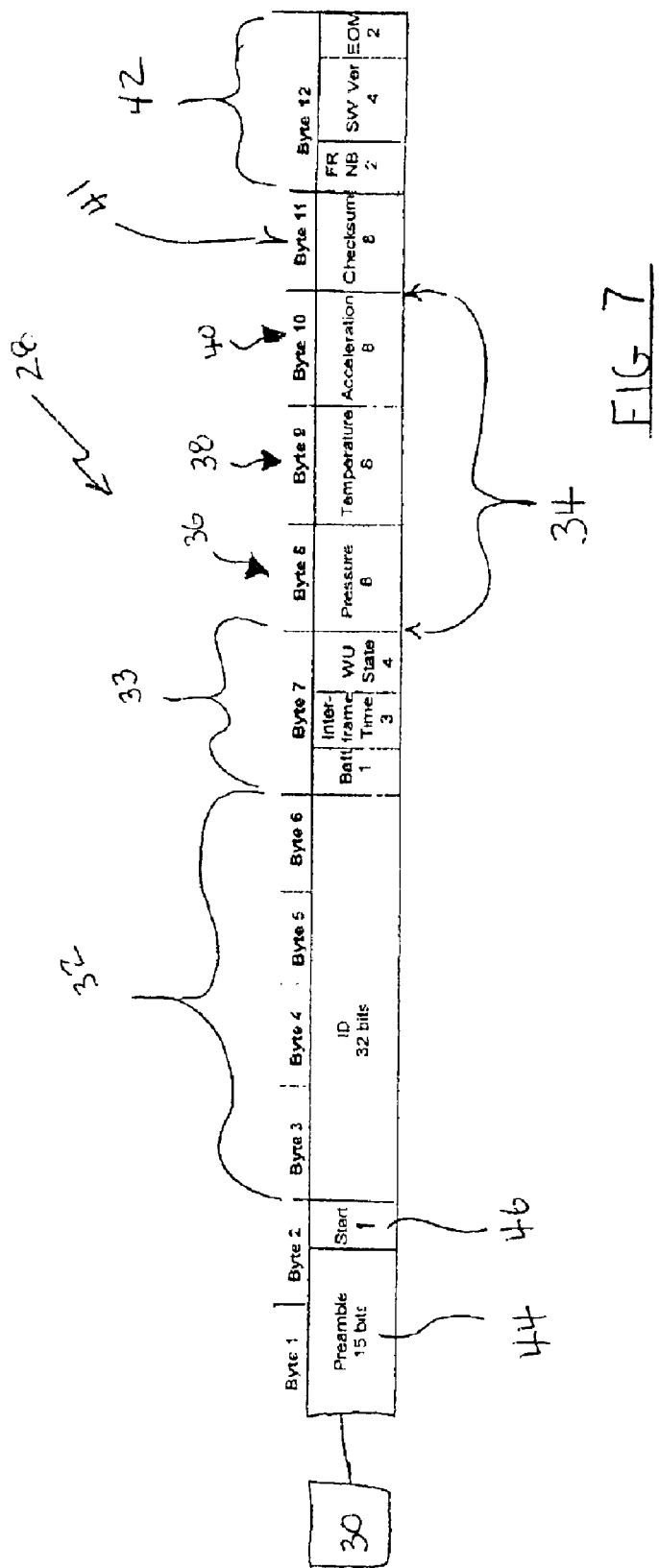

COMBINED TIRE PRESSURE MONITORING AND KEYLESS ENTRY RECEIVER

The present application is a continuation in part of U.S. patent application Ser. No. 10/079,665 filed Feb. 20, 2002 that claims priority to U.S. Provisional Patent Application Ser. Nos. 60/276,210 filed Mar. 15, 2001; 60/269,959 filed Feb. 20, 2001; 60/276,325 filed Mar. 16, 2001; 60/298,258 Jun. 14, 2001; 60/290,923 filed May 15, 2001, 60/352,489; filed on Jan. 23, 2002, and 60/349,882 filed Jan. 17, 2002.

BACKGROUND OF THE INVENTION

This invention relates to a receiver assembly for receiving transmissions of varying formats and specifically to a receiver assembly for receiving both amplitude shift keyed signals and frequency shift keyed signals.

Conventional methods of monitoring tire pressure include positioning a sensor within each wheel to monitor pressure. The sensor assembly typically emits a radio frequency (RF) transmission indicative of tire conditions. A receiver disposed within the vehicle receives the RF signal and actuates a messages or warning light to signal the operator of tire conditions.

Many motor vehicles include a remote keyless entry system including a key fob carried by an operator to actuate door locks or other features. The remote keyless entry system includes a receiver disposed within the motor vehicle to receive transmissions from the key fob and actuate vehicle systems in response to transmissions received from the key fob. It is known in some systems to utilize the same type of transmission for the tire monitoring system as is used in remote keyless entry system.

Typically, a transmission is modulated as either an amplitude shift keyed ASK, or a frequency shift keyed FSK radio frequency. The ASK transmission modulation is best suited for applications in which the receiver and transmitter are relative stationary to each other. In addition ASK transmissions are favorable when there exists a relatively long distance between the transmitter and the receiver. However, an ASK transmission becomes disrupted when the receiver or transmitter is moving relative to one another. The FSK signal is suited for transmitters that are moving relative to the receiver because the amplitude remains essentially constant for the duration of any transmission. However, the FSK transmission has lower peak field strength than a comparable ASK transmission. The FSK transmission is specifically suited for use with the sensor assembly disposed within the tire and the ASK is suited for use with the remote keyless entry system.

Accordingly, it is desirable to develop a receiver capable of receiving both ASK and FSK transmissions to optimize the capabilities of both the tire monitoring system and the remote keyless entry system.

SUMMARY OF THE INVENTION

An embodiment of this invention is a receiver assembly including an amplitude key shifted mode and a frequency shift mode for receiving transmissions from different systems within a motor vehicle.

The receiver of this invention receives signals from a tire pressure monitoring system and the remote keyless entry system. The receiver assembly forwards data received from each system to a vehicle controller. The vehicle controller processes data for the tire pressure monitoring system to indicate tire conditions or the remote keyless entry system to actuate unlocking of doors or other such functions as are known to a worker skilled in the art.

The receiver assembly comprises an Amplitude Shift Keyed mode (ASK) and a Frequency Shift Keyed mode (FSK). The FSK mode receives signals from the sensor assemblies of the tire pressure monitoring system. The ASK mode receives signals from a key fob for the remote keyless entry system to initiate locking or unlocking of doors.

The receiver receives first and second signals, each in different formats. Each signal is configured for the specific application of data transmission. ASK transmissions are favorable for situations where the transmitter and receiver are substantially stationary. The ASK radio frequency transmission is easily disrupted by abrupt changes in received field strength and therefore are not favorable sending transmission from a moving object such as the tires of a motor vehicle. However, the ASK provides greater signal power which is desirable for the remote keyless entry system of this invention. The ASK transmission allows for higher peak output field strength, relative to a comparable FSK transmission. However, the ASK transmission decreases typical battery life and is therefore not desirable for applications such as tire condition sensing that require longer battery life due to the difficulty of changing batteries of the sensor assemblies disposed within the tire of the motor vehicle.

The FSK signal is favorable for conditions were the transmitter or receiver is moving during data transmission. As appreciated, rotation of a tire will introduce amplitude variations in the transmission caused by changes in received field strength. If the sensor assembly data was transmitted by way of an ASK transmission, the noise caused by rotation of the tire would cause data in the transmission to become corrupted. However, an FSK transmission is amplified upon receipt to effectively remove any amplitude disturbances. Further, the FSK transmission is less power intensive and therefore more adaptable to the sensor assembly application that requires longer battery life.

The receiver assembly includes the ASK mode and the FSK mode providing one receiver for both the remote keyless entry system and the tire monitoring system. Sensor assemblies of the tire pressure monitoring system transmit a signal emitted that includes an ASK wakeup pattern, an identity code and a data signal. The signal is a FSK transmission, except for the ASK wake up pattern that precedes the signal.

The wake up pattern precedes the signal to indicate that subsequent signals sent to the receiver will be in FSK format. Once a first wake up pattern is received from the signal and wake up pattern are repeated to ensure that the receiver accurately receives data. If the data signal is sent more than once, subsequent signals do not require the wake up pattern. The wake up pattern is used only before a series of signal repeats or bursts.

The receiver assembly defaults to the ASK mode. In the ASK mode the receiver operates at a lower power and is therefore the default mode that is on when the receiver assembly is activated. The ASK wake up signal alerts the receiver assembly to incoming FSK transmission, which causes the receiver assembly to switches to FSK mode. The switch between ASK and FSK mode provides use of a signal receiver for gathering data from several different motor vehicle systems using differing data signal formats.

The system of this invention includes a receiver capable of receiving both ASK and FSK transmissions providing a single receiver capable of receiving data from more than one system with the motor vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6 is a schematic representation of a wake up pattern; and FIG. 7 is a schematic view of a data signal.

DETAILED DESCRIPTION OF THE PREFERRED EMBODIMENT

Figure 1:
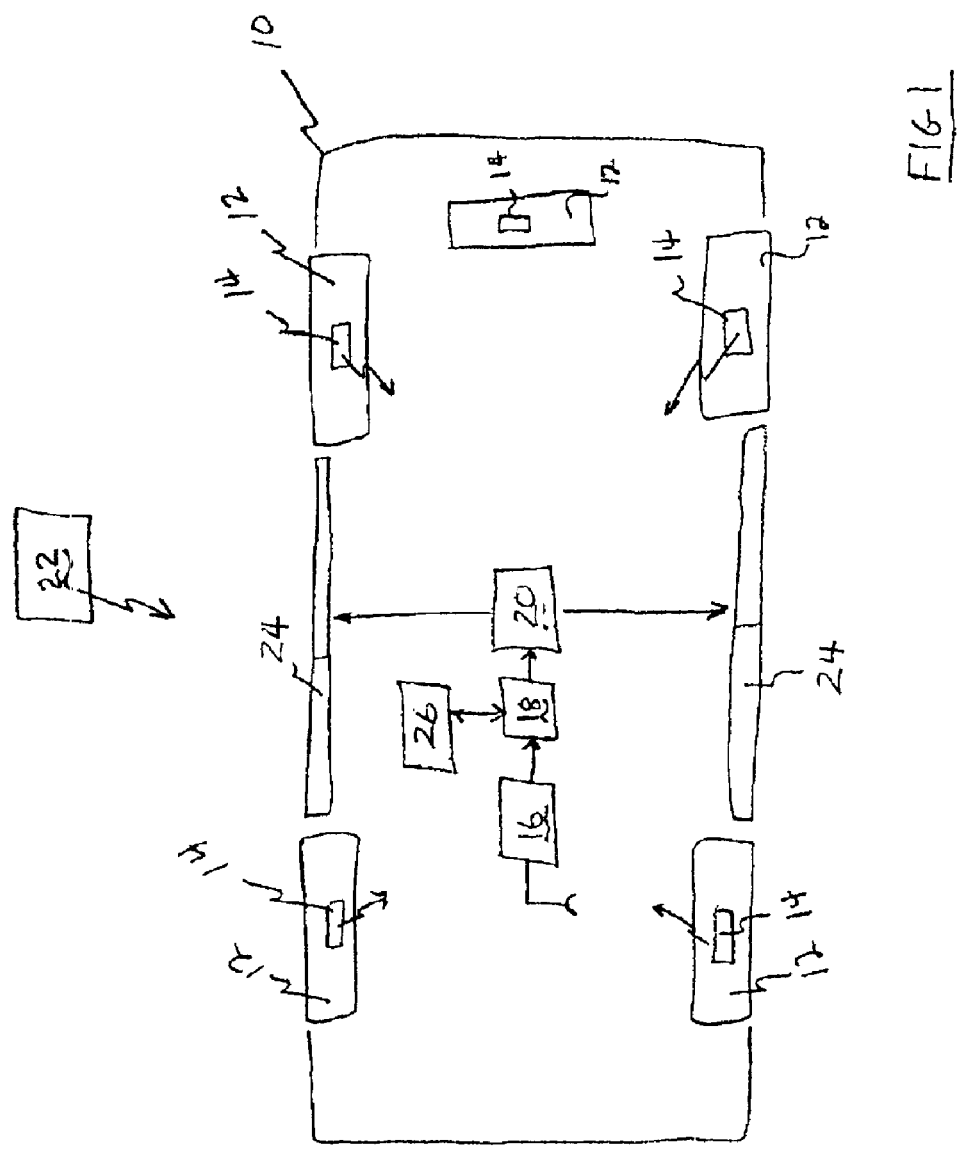
FIG. 1 is a schematic view of a motor vehicle including a tire monitoring and remote keyless entry system.

An embodiment of this invention is a receiver 16 for receiving data from more than one system of a motor vehicle 10 shown schematically in FIG. 1. One system is a tire pressure monitoring system 26 including sensor assemblies 14 disposed within each of four tires 12 along with an additional tire 12 carried as a spare. The sensor assemblies 14 gather data indicative of conditions within each tire 12 and transmit data signals to the receiver assembly 16. The motor vehicle 10 also includes a remote keyless entry system 20 for locking and unlocking doors of the motor vehicle 10. The receiver 16 of this invention can also receive signals from other systems disposed within the motor vehicle 10 as are known to a worker skilled in the art. The tire pressure monitoring system 26 and the remote keyless entry system 20 are discussed as examples of how the receiver 16 of this invention operates to receive data from more than one system of the motor vehicle 10.

The receiver assembly 16 forwards data received from each of the systems 20, 26 to a vehicle controller 18. The vehicle controller 18 processes data for the tire pressure monitoring system 26 to indicate tire conditions or the remote keyless entry system 20 to actuate unlocking of doors 24 or other such functions as are known to a worker skilled in the art. Preferably the remote keyless entry system 20 is an active system requiring actuation, such as by depressing buttons on a key fob 22, however, it is within the contemplation of this invention for passive remote keyless entry system that do not require a positive action by the operator.

The receiver assembly 16 of this system is also used with the remote keyless entry system 20. The receiver assembly 16 is configured to receive transmission from both the sensor assemblies 14 and the key fob 22. Although a key fob 22 is specifically described, it is within the contemplation of this invention that the remote keyless entry system 20 includes other active or passive transmitting means to initiate entry or operation of the motor vehicle 10.

The tire pressure monitoring system 26 receives data from the sensor assemblies 14 through the receiver 16 and controller 18. The controller 18 in turn coordinates display of information indicative of current tire conditions to an operator of the motor vehicle 10. The specific configuration of the tire pressure monitor system 26 can be of any type known to a worker skilled in the art. Further, it is within the contemplation of this invention that the receiver 16 can receive data from other systems disposed within the motor vehicle known to a worker skilled in the art.

Figure 2:
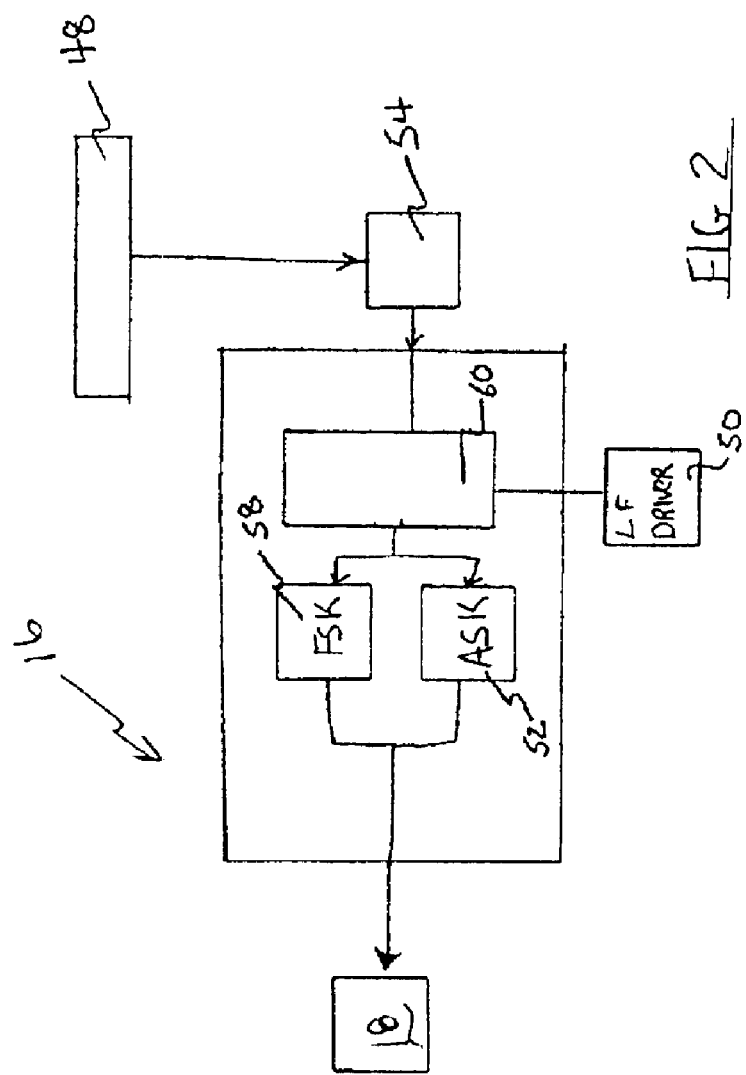
FIG. 2 is a schematic view of the receiver assembly

Referring to FIGS. 1 and 2, the receiver assembly 16 comprises an Amplitude Shift Keyed mode (ASK) 52 and a Frequency Shift Keyed mode (FSK) 58. The FSK mode 58 receives signals from the sensor assemblies 14. The ASK mode receives signals from a key fob 22 for the remote keyless entry system 20 to initiate locking or unlocking of doors 24. The receiver assembly 16 also includes an antenna 48 to receive transmissions from the key fob 22 and the sensor assemblies 14. The receiver assembly 16 includes a low frequency driver 50 to emit a signal to the sensor assemblies 14 to initiate transmission by the sensor assemblies 14.

The antenna 48 is preferably of a length one quarter that of the wavelength of the transmission received. Transmission received by the antenna 48 proceed through resistor 54 to the RF receiver 16. A controller 60 controls which of the 58 and 52 are engaged to receiver incoming transmission.

Figure 3:
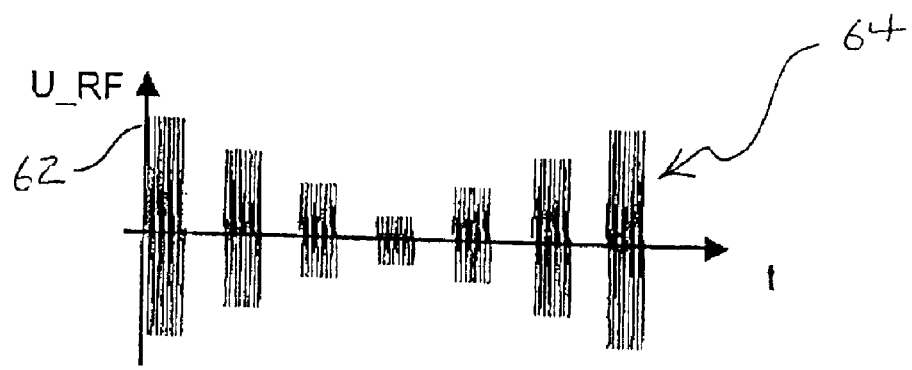
FIG. 3 is a graph comparing field strength over time of an ASK signal

The receiver 16 receives first and second signals, each in different formats. Each signal is configured for the specific application of data transmission. ASK transmissions are favorable for situations where the transmitter and receiver are substantially stationary. The ASK radio frequency transmission is easily disrupted by abrupt changes in received field strength and therefore are not favorable sending transmission from a moving object such as the tires 12 of a motor vehicle 10. Referring to FIG. 3, the received field strength 62 of an ASK signal 64 is shown for an application where the receiver and transmitter move relative to each other. The changes in the received field strength 62 change for any number or reasons within a motor vehicle including interference created by other onboard systems and the specific environment present at the time of the signal. However, the ASK signal provides greater signal power which is desirable for the remote keyless entry system of this invention. The ASK signal allows for higher peak output field strength, relative to a comparable FSK signal. However, the ASK signal decreases typical battery life and is therefore not desirable for applications such as tire condition sensing that require longer battery life due to the difficulty of changing batteries of the sensor assemblies disposed within the tire of the motor vehicle.

Figure 4:
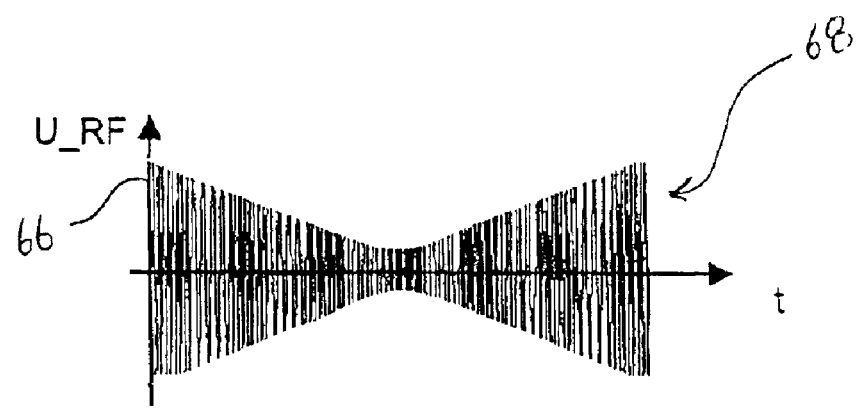
FIG. 4 is a graph comparing field strength over time for an FSK signal

Referring to FIG. 4, an FSK signal 68 is favorable for conditions were the transmitter or receiver is moving during data transmission. As appreciated, rotation of a tire will introduce amplitude variations in the transmission caused by changes in received field strength 66. If the sensor assembly 14 data was transmitted by way of an ASK signal, the noise caused by rotation of the tire would cause data in the transmission to become corrupted. However, an FSK signal is amplified upon receipt to effectively remove any amplitude disturbances. Further, the FSK signal is less power intensive and therefore more adaptable to the sensor assembly application that requires longer battery life.

Figure 5:
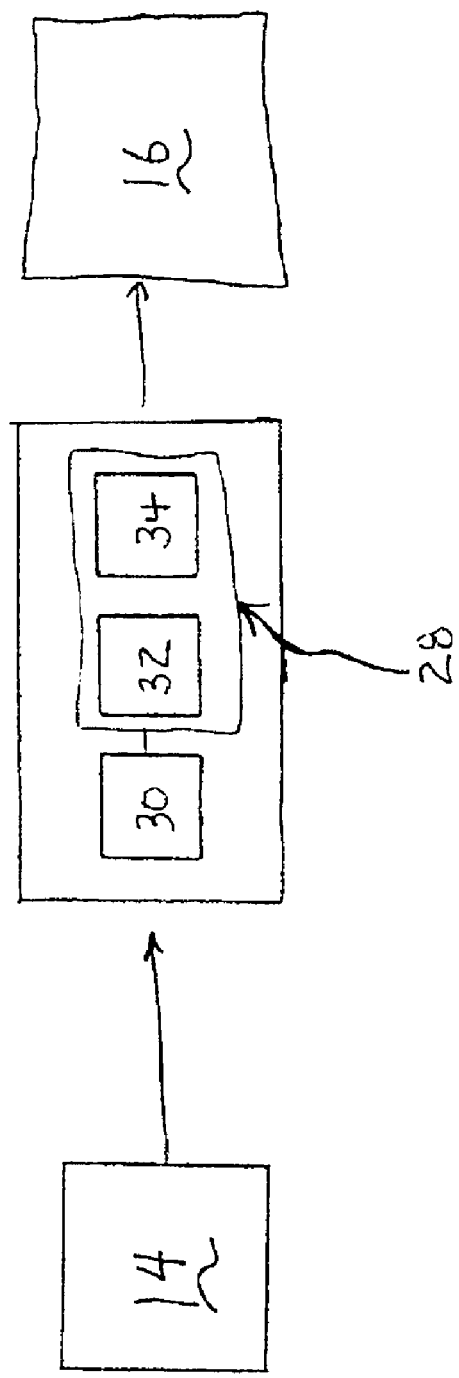
FIG. 5 is a schematic representation of a signal sent to the receiver from a motor vehicle system.

Referring to FIGS. 2 and 5, the receiver assembly 16 is shown schematically and includes ASK mode 52 and FSK mode 58. This configuration allows the receiver assembly 16 to be used for both the remote keyless entry system 20 and the tire monitoring system. Sensor assemblies 14 of the tire pressure monitoring system 26 transmit a signal 28 emitted that includes an ASK wakeup pattern 30, an identity code 32 and a data signal 34. The signal 28 is a FSK transmission, except for the ASK wake up pattern 30 that precedes the signal 28.

FIGS. 5–7 schematically illustrate the content of the signal 28 transmitted from sensor assembly 14 to the receiver 16. Preferably, the signal includes 96 bits that is transmitted at 9600 baud or 10 milliseconds per data frame. Note that it is within the contemplation of this invention that the signals comprise varying bit lengths and transmission rates according to application specific parameters. The signal 28 illustrated is from the sensor assembly 14 of the tire pressure monitoring system 26 and is an example of one type of signal within the scope and contemplation of this invention.

The wake up pattern 30 precedes the single 28. The wake up pattern 30 is 50 ms in duration and includes a portion 70 that indicates that subsequent signals sent to the receiver 16 will be in FSK format. The portion 70 preferably comprises 5 bytes. Each byte includes information according to each specific application that initiates activation of the FSK mode 58. Further, once a first wake up pattern 30 is received from the signal 28 and wake up pattern 30 are repeated to ensure that the receiver 16 accurately receives data. If the data signal is sent more than once, subsequent signals 28 do not require the wake up pattern 30. The wake up pattern 30 is used only before a series of signal repeats or bursts.

Referring to FIG. 7, the single 28 includes a preamble portion 44 of 15 bits and a start portion 46 of 1 bit that initializes the signal 28 with the receiver 16. Identification portion 32 includes 32 bits of information that includes the identification information necessary to correlate the information received from each sensor assembly 14 with specific vehicle parameters. Byte 7 indicated at 33 provides information on battery status and the time delay to the next frame of data. The time delay provides for interleaving of signals from various sensors to prevent signal collisions. Further, byte 7, indicated at 33 provides a wheel unit state.

The wheel unit state is an indication of conditions within the specific tire 12. The wheel unit state indicated at 12 includes fast and slow pressure changes with the motor vehicle 10 in part, normal driving and test mode, transmissions due to fast pressure or temperature changes and low frequency detection driving and test mode. Note that the conditions are only some of the possible wheel conditions that can be indicated by signal and it is within the contemplation of this invention that other conditions as known by a worker in the art may be used.

The signal 28 also includes the data indicated at 36, 38 and 40 for the specific tire. The byte indicated at 36 is indicative of pressure within the tire. The byte indicated at 38 is indicative of temperature within the tire and the byte indicated at 40 is indicative of acceleration of the tire. Further, bytes comprising the signal include a "checksum", indicated at 41 along with byte 42 that provides data indicative of the frame number, software version, and end of message (EOM). Note that although the contents of the data signal 28 are described in detail, it is within the contemplation of this invention that the data signal 28 may comprise any data depending on application specific requirements, as would be known to a worker skilled in the art.

Referring to FIG. 2, the receiver assembly 16 defaults to the ASK mode 52. The receiver 16 in ASK mode 52 operates at a lower power and is therefore the default receiver that is on when the receiver assembly 16 is activated. The receiver 16 will switch over to the FSK mode 58 in response to a triggering event. Preferably the triggering event is receipt of the wake up signal 30, however, other triggering events such as motor vehicle speed or acceleration are also within the contemplation of this invention. The conditions of the motor vehicle 10 traveling above the desired speed or in a parked position provide definite indicators for the switch between FSK and ASK modes 58, 52. However, when the vehicle 10 is idling, for instance in a traffic jam, but not moving at the desired speed to switch from the ASK mode 52 and the FSK mode 58 the system will not switch over to the FSK mode 58 unless another conditions are satisfied.

Each signal 28 is preceded by the ASK wake up pattern 30 that is sent before the FSK signal. The ASK wake up pattern 30 alerts the receiver assembly 16 to incoming FSK transmission, which causes the receiver assembly 16 to switch over to the FSK mode 58. The switch between ASK and FSK modes 58,52 provides use of a signal receiver 16 for gathering data from several different motor vehicle systems using differing data signal formats. Therefore, providing for the optimal data signal to be used for each system of the motor vehicle 10.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A receiver assembly for receiving signals from different devices with differing signal formats comprising;
   an amplitude shift keyed made for receiving an amplitude shifted keyed signal; and
   a frequency shift keyed mode to receive a shift keyed signal, said amplitude shift keyed mode engaged to receive signals in a default condition, said frequency shift keyed mode engaged to receive signals in response to a wake up pattern.

2. The assembly of claim 1, wherein said wake up pattern precedes said frequency shift keyed signal.

3. The assembly of claim 1, wherein said amplitude shift keyed signal includes said wakeup pattern initiating receipt of a subsequent signal by said receiver in said frequency shift keyed mode.

4. The assembly of claim 2, wherein said wake up pattern is an amplitude shift keyed signal.

5. The assembly of claim 4, wherein said amplitude shift keyed wake up pattern initiates engagement of said frequency shift keyed mode to receive a frequency shift keyed signal.

6. The assembly of claim 5, wherein subsequent frequency shift keyed signals do not include said wake up pattern.

7. The assembly of claim 5, wherein a series of frequency shift keyed signals are transmitted, said series includes an initial signal preceded by said wake up pattern, and subsequent signals not preceded by said wake up pattern.

8. The assembly of claim 7, wherein said receiver reverts back to said amplitude shift keyed mode in response to a triggering event.

9. The assembly of claim 8, wherein said triggering event is a passage of a predetermined amount of time.

10. The assembly of claim 8, wherein said triggering event is receipt of an amplitude shift keyed signal.

11. The assembly of claim 1, wherein said amplitude shift keyed signal is emitted by a remote keyless entry system for a motor vehicle.

12. The assembly of claim 1, wherein said frequency shift keyed signal is emitted by a tire pressure monitoring system for a motor vehicle.

13. A method of receiving signals of different formats from different systems comprising the steps of;
   a. receiving a first signal in an amplitude shift keyed mode;
   b. receiving a second signal in a frequency shift keyed mode, said second signal differing from said first signal and including a wake up pattern; and
   c. switching between said first and second modes in response to receipt of said wake up pattern.

14. The method of claim 13, wherein said first signal is an amplitude shift keyed signal and said second signal is a frequency shift keyed signal.

15. A method of receiving signals of different formats from different systems comprising the steps of:
   a) receiving a first signal in an amplitude shift keyed mode;
   b) receiving a second signal in a frequency shift keyed mode, said second signal differing from said first signal and including an amplitude shift keyed wake up pattern; and
   c) switching between said amplitude shift keyed mode and said frequency shift keyed mode in response to receipt of said wake up pattern, said amplitude shift keyed wake up pattern alerting the receiver assembly to switch to said frequency shift keyed mode for receipt of a subsequent frequency shift keyed signal.

16. The system of claim 13, wherein an amplitude shift keyed wake up pattern initiates said step c.

17. The method of claim 13, further including the steps of emitting a frequency shift keyed signal from a tire pressure monitoring system, and emitting an amplitude shift keyed signal from a remote keyless entry system.

18. A receiver assembly for receiving signals from different devices with differing signal formats comprising:
   an amplitude shift keyed mode for receiving an amplitude shift keyed signal; and
   a frequency shift keyed mode to receive a frequency shift keyed signal, wherein said amplitude shift keyed mode is engaged to receive signals in a default condition, and said frequency shift keyed mode is engaged to receive signals in response to an amplitude shift keyed wake up pattern.

19. The assembly of claim 18, wherein frequency shift keyed signals following said amplitude shift keyed wake up pattern do not include said amplitude shift keyed wake up pattern.

20. The assembly of claim 18, wherein a series of frequency shift keyed signals are transmitted, said series includes an initial signal preceded by said amplitude shift keyed wake up pattern, and subsequent signals not preceded by said amplitude shifted keyed wake up pattern.

21. The assembly of claim 18, wherein said amplitude shift keyed signal is emitted by a remote keyless entry system for a motor vehicle.

22. The assembly of claim 18, wherein said frequency shift keyed signal is emitted by a tire pressure monitoring system for a motor vehicle.

* * * * *